United States Patent [19]
Babuder et al.

[11] Patent Number: 5,586,477
[45] Date of Patent: Dec. 24, 1996

[54] BAR STOCK FEEDER METHOD AND APPARATUS HAVING SEPARABLE GUIDE TUBE SECTIONS

[75] Inventors: Kirt M. Babuder, Euclid; Douglas A. Joseph, Concord Township; Donald Pistoor, Willoughby Hills; L. Joseph Stupica, Euclid, all of Ohio

[73] Assignee: Devlieg-Bullard, Inc., Westport, Conn.

[21] Appl. No.: 557,379

[22] Filed: Nov. 13, 1995

Related U.S. Application Data

[63] Continuation of Ser. No. 107,946, Aug. 17, 1993, abandoned.

[51] Int. Cl.$^6$ .................................................. B23B 15/00
[52] U.S. Cl. .................................. 82/126; 414/17
[58] Field of Search ....................................... 82/125, 126

[56] References Cited

U.S. PATENT DOCUMENTS

| | | | |
|---|---|---|---|
| Re. 29,905 | 2/1979 | Scheurer | 214/1.2 |
| 4,061,061 | 12/1977 | Lahm et al. | 82/2.5 |
| 4,129,220 | 12/1978 | Peterson et al. | 214/1.2 |
| 4,221,141 | 9/1980 | Oliver | 82/2.5 |
| 4,292,864 | 10/1981 | Cucchi et al. | 82/126 |
| 4,352,615 | 10/1982 | Neukomm | 414/17 |
| 4,406,190 | 9/1983 | Mason | 82/2.5 |
| 4,421,446 | 12/1983 | Leon et al. | 414/17 |
| 4,577,536 | 3/1986 | Lechot et al. | 82/2.7 |
| 4,624,612 | 11/1986 | Geiser et al. | 414/18 |
| 4,649,779 | 3/1987 | Juillerat | 82/2.7 |
| 4,977,801 | 12/1990 | Fabri | 414/18 |
| 5,020,402 | 6/1991 | Link et al. | 82/124 |
| 5,099,730 | 3/1992 | Link et al. | 82/153 |
| 5,115,702 | 5/1992 | Link | 82/126 |
| 5,146,819 | 9/1992 | Geiser et al. | 82/126 |

FOREIGN PATENT DOCUMENTS

| | | |
|---|---|---|
| 0108182 | 5/1984 | European Pat. Off. . |
| 0121638 | 10/1984 | European Pat. Off. . |

OTHER PUBLICATIONS

International Search Report.
National Acme brochure, date unknown (F.A.S.T.) Modern Machine Shop article, Sep. 1992.
LNS America, Inc. bulletin, copyright 1990.

*Primary Examiner*—M. Rachuba
*Assistant Examiner*—Kenneth J. Hansen
*Attorney, Agent, or Firm*—Watts, Hoffmann, Fisher & Heinke Co., L.P.A.

[57] ABSTRACT

A bar stock feeder for feeding bar stock to a multiple spindle lathe is disclosed. The bar stock feeder has several guide tubes, each for holding a piece of stock. The tubes are flooded with hydraulic fluid to provide a film of fluid to support the pieces of stock. Each tube contains a piston for advancing the pieces of stock towards the lathe. The tubes have a pivoting part which allows the operator to separate the tubes for reloading. The pistons are retracted into the pivoting part of the tubes prior to separation such that they are not in the way during reloading.

19 Claims, 10 Drawing Sheets

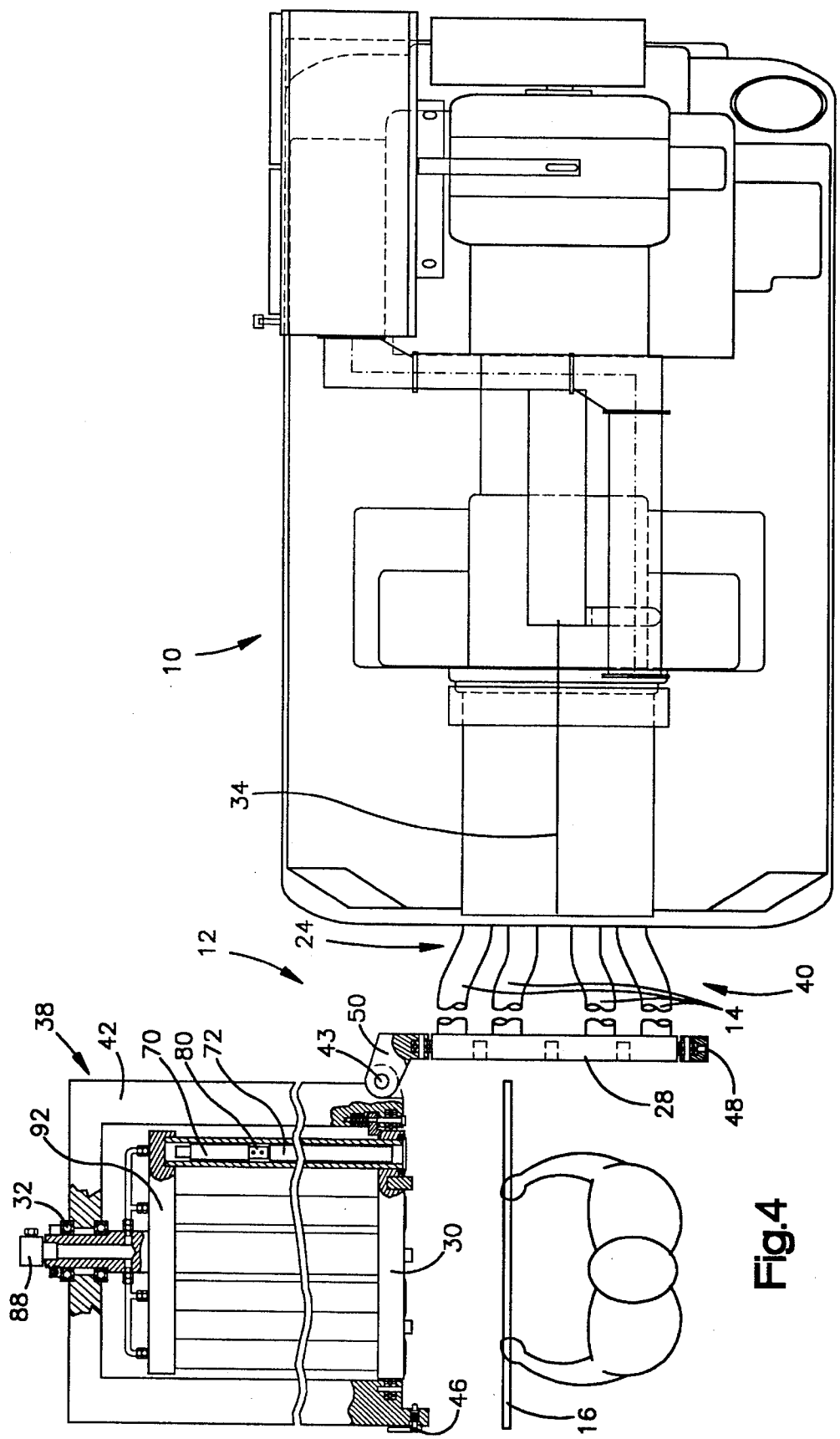

BAR STOCK FEEDER METHOD AND APPARATUS HAVING SEPARABLE GUIDE TUBE SECTIONS

This is a continuation of application Ser. No. 08/107,946 filed on Aug. 17, 1993 now abandoned.

BACKGROUND OF THE INVENTION

1. Field of the Invention

This invention relates to a bar stock feed and support apparatus for a multiple spindle automatic lathe, and more particularly, to a fluid operated, multiple-tube bar stock feeder using fluid to support pieces of bar stock.

2. Description of the Related Art

High-production multiple-spindle lathes or screw machines are typically equipped with automatic bar stock feeders for advancing stock. It has been proposed in bar stock feeders to support the rotating bar stock on a film of oil within a guide tube. Bar feeders using such an oil film are usually called hydraulic, hydrodynamic or hydrostatic bar feeders. The oil film reduces friction, dampens vibrations, reduces noise, centers the bar stock, and allows higher turning speeds. The higher speeds allow higher production. The centering and reduced vibration results in improved surface finishes.

Hydraulic bar feeders have been used with varying degrees of success. In one design, bars were advanced through guide tubes with a reciprocating friction feeder connected to the lathe. The guide tubes were flooded with oil to achieve the oil film support. Removable caps were provided at the rear end (the end opposite the lathe headstock) for reloading the guide tubes with bars. A shortcoming of this design was that oil poured out of the tubes when the cap was removed for reloading. The oil could be recovered with a catch basin but still created a messy work area.

In another design, pistons were provided at the rear end of the guide tubes for advancing the bar stock. The pistons overcame the need for a conventional mechanical bar stock advancer and its many moving parts on the lathe. The guide tubes were flooded with oil which was allowed to flow through a restricted opening in the pistons. This design permitted reloading of the guide tubes from the front end, which avoided the problem of having to remove the pistons for reloading. That is, the entire stock magazine was pivotable such that the front end of the guide tubes could be laterally pivoted away from the head stock for reloading. One shortcoming if this design is that reloading had to be done from the side of the machine rather than from its end. This interfered with the operator and caused inconvenience where many machines were positioned in side-to-side rows. Thus, there is a need for a bar stock feeder using an oil film to support the stock, fluid actuated pistons to advance the stock, and the guide tubes which can be reloaded from their rear end without having oil pour out of the tubes during reloading.

SUMMARY OF THE INVENTION

Basically, the invention is an apparatus for aligning and feeding bar stock to the work area of a multiple spindle lathe. The guide comprises a plurality of parallel guide tubes for supporting lengths of bar stock and a plurality of pistons. Each piston is fitted to slide inside one of the guides tubes for engaging one end of a corresponding length of bar stock and pushing it toward the work area. A fluid pressure device is provided to deliver fluid to the inside of the guide tubes to move the pistons. A mechanism is provided for separating each of the guide tubes into two parts to permit reloading of bar stock into the tubes with the piston in a retracted position.

Preferably, the mechanism for separating the guide tubes comprises a pivot mechanism which connects a pivoting part of each of the guide tubes to a non-pivoting part. In one embodiment, the pivoting parts of the tubes are rotatably supported such that the guide tubes may orbit a center axis. In another embodiment, the pivoting parts are stationary during lathe operation and a rotating coupling is provided between the pivoting parts and the non-pivoting parts such that the non-pivoting parts may rotate about a center axis during lathe operation.

In the preferred and illustrated embodiment, a reversible pump is provided for moving the pistons toward and away from the lathe. Also, each piston includes a passage for permitting fluid to flow through the piston to the opposite side of the piston. A fluid return vessel is provided at the lathe end of the guide tubes. The vessel catches fluid which flows from the tubes and returns it to a reservoir tank from which the pump draws fluid.

BRIEF DESCRIPTION OF THE DRAWINGS

Preferred embodiments of the invention are shown in the accompanying drawings in which:

FIG. 4 is a plan view with portions omitted of the bar stock feeder of FIG. 1 being manually reloaded;

DESCRIPTION OF THE PREFERRED EMBODIMENT

Figure 1:
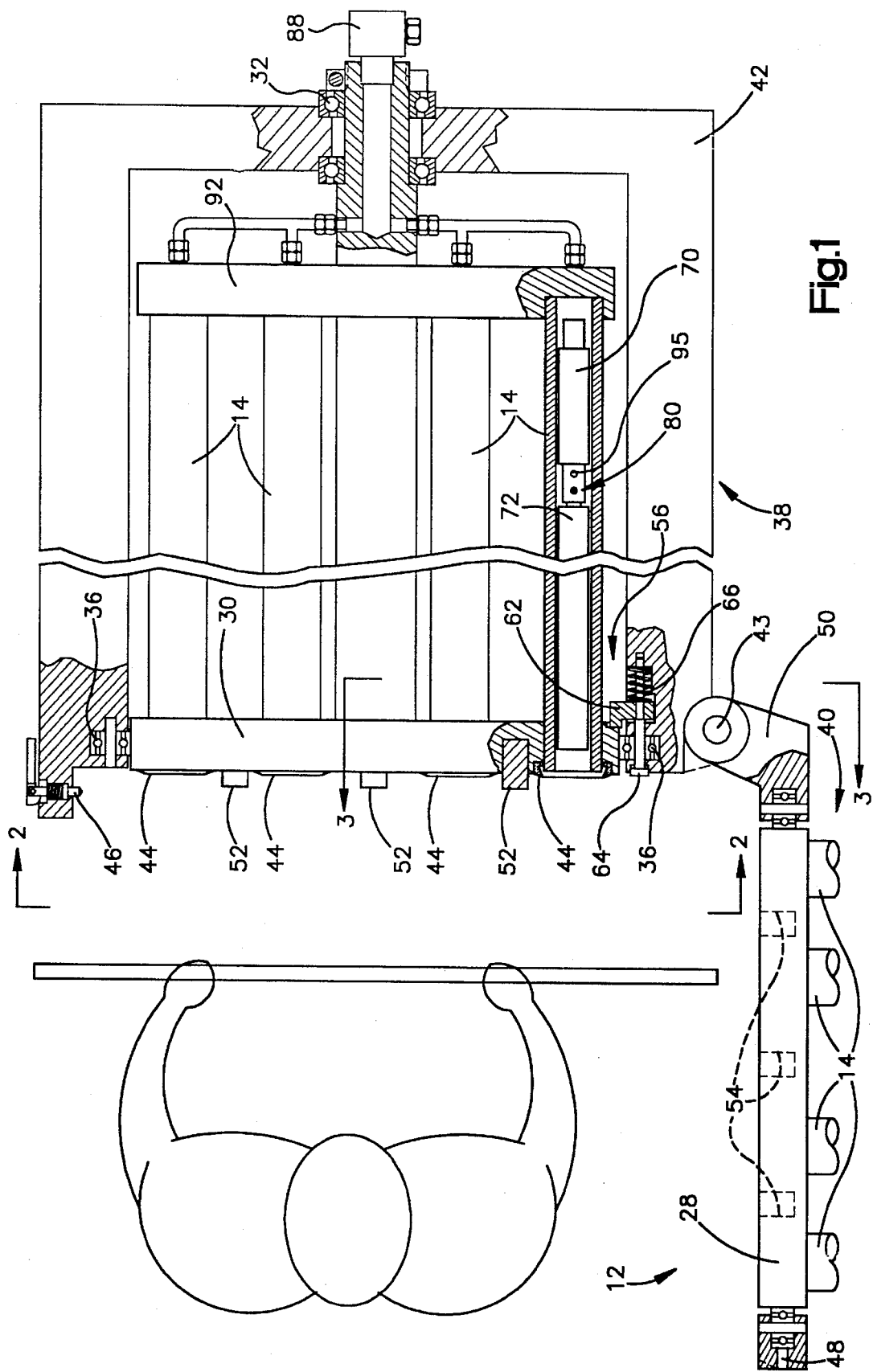
FIG. 1 is a plan view with portions omitted and parts cut away of the bar stock feeder of the present invention being manually reloaded.

Referring to FIG. 4, a multiple spindle lathe 10 is shown having a multiple-tube bar stock feeder 12. The bar stock feeder 12 has a plurality of tubes 14 for holding pieces of bar stock 16. Each tube 14 is coaxially aligned with a rotatable spindle 18 of the lathe 10. The spindles are adapted to grip and rotate a piece of bar stock 16 so the forward end of the bar stock 16 can be machined. The bar stock 16 is intermittently axially fed towards the lathe 10 as it is depleted. The spindles 18 move orbitally between a number of different machining stations.

Figure 6:
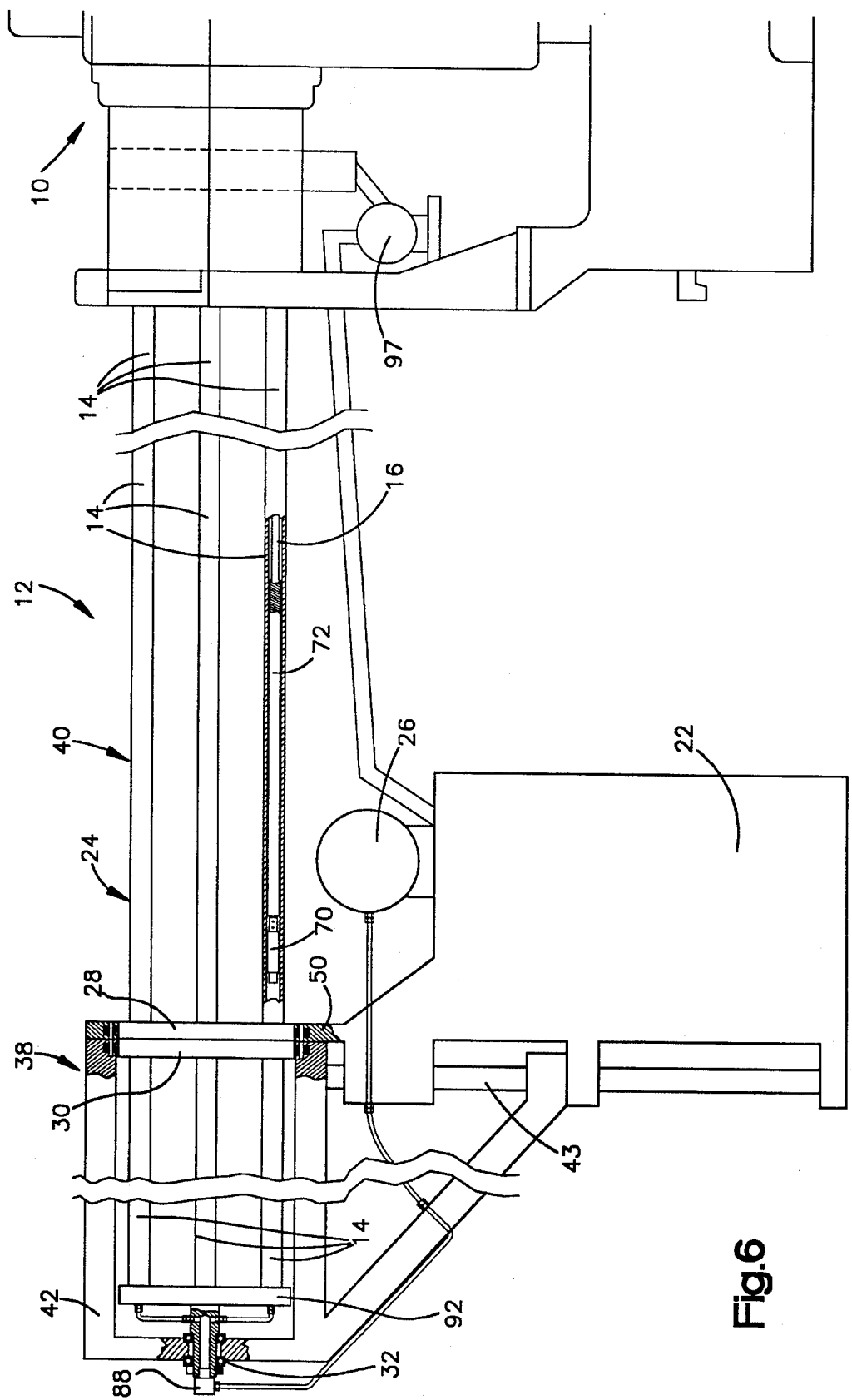
FIG. 6 is a partial front elevational view with portions cut away of the bar stock feeder while in operation.

Referring to FIG. 6, the bar stock feeder 12 includes a base 22, a magazine 24, a fluid delivery pump 26, and a fluid recovery device 20. The magazine 24 has rotatable support members 28, 30 which hold the tubes 14 in a circular array. Sets of rollers 36 engage the outer periphery of each of the support members 28, 30 to support the magazine 24 such that it rotates about a center axis 34. Thus, the tubes 14 thus orbit the center axis 34 when the magazine 24 rotates. The front end of the magazine 24 (the end near the lathe 10) is supported on a front bearing (not shown). The magazine 24 is rotated by a drive mechanism (not shown) connected to the lathe 10 in a conventional manner such that the tubes 14 are always aligned with and move in synchronism with the spindles 18. A set of end bearings 32 rotatably supports the rear end of the magazine 24.

As seen in FIG. 1, to permit reloading of the bar stock feeder 12, the magazine 24 separates into two parts; a pivoting part 38 and a non-pivoting part 40. To reload the feeder 12, the pivoting part 38 is separated, as seen in FIGS. 1 and 4, and new pieces of stock 16 are manually inserted into the tubes 14 and fed toward the spindles 18. The pivoting part 38 is supported by a pivoting frame 42, which rotates on a hinge pin 43. The pin 43 is connected to the base 22 as seen in FIG. 6. A latch member 46 is provided on the pivoting frame 42 for engaging a catch 48 on a stationary frame 50. The latch 46,48 serves to secure the pivoting frame 42 and the pivoting part 38 to the stationary frame and the non-pivoting part. Thus, once the tubes 14 are reloaded, the pivoting part 38 is pivoted against the non-pivoting part 40 and latched. Circular elastomeric seals 44 (FIG. 1) are provided to seal each tube 14 at the interface between the pivoting part 38 and the non-pivoting part 40. FIG. 6 shows the magazine 24 in its closed and latched position.

Referring to FIG. 1, a number of pins 52 extend axially from the support member 30 for rotating the pivoting part 38 in synchronism with the non-pivoting part 40 and for maintaining proper alignment between the two parts. The pins 52 engage a corresponding group of sockets 54 on the non-pivoting support member 28 when the magazine is in its closed position.

Figure 3:
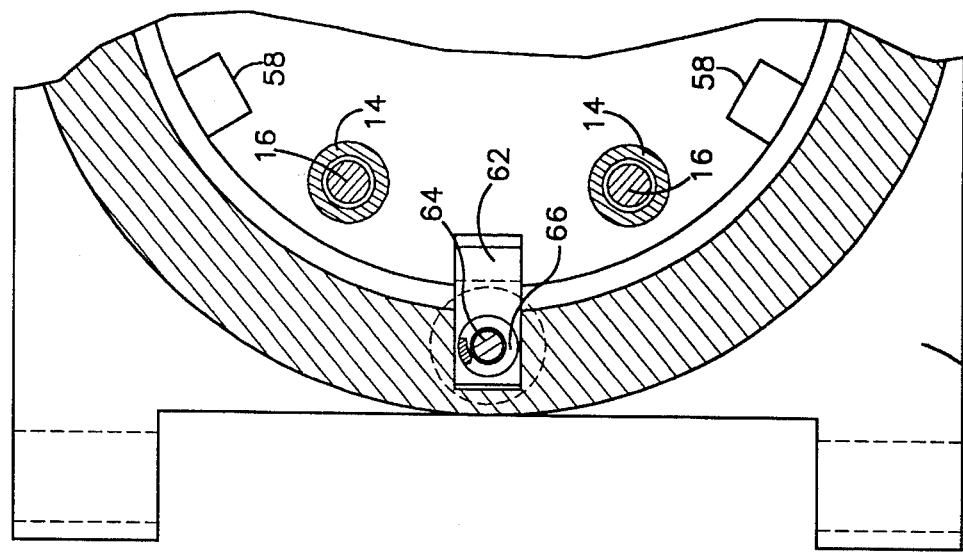
FIG. 3 is a partial sectional view as seen approximately from the plane indicated by the line 3—3 in FIG. 1.
Figure 2:
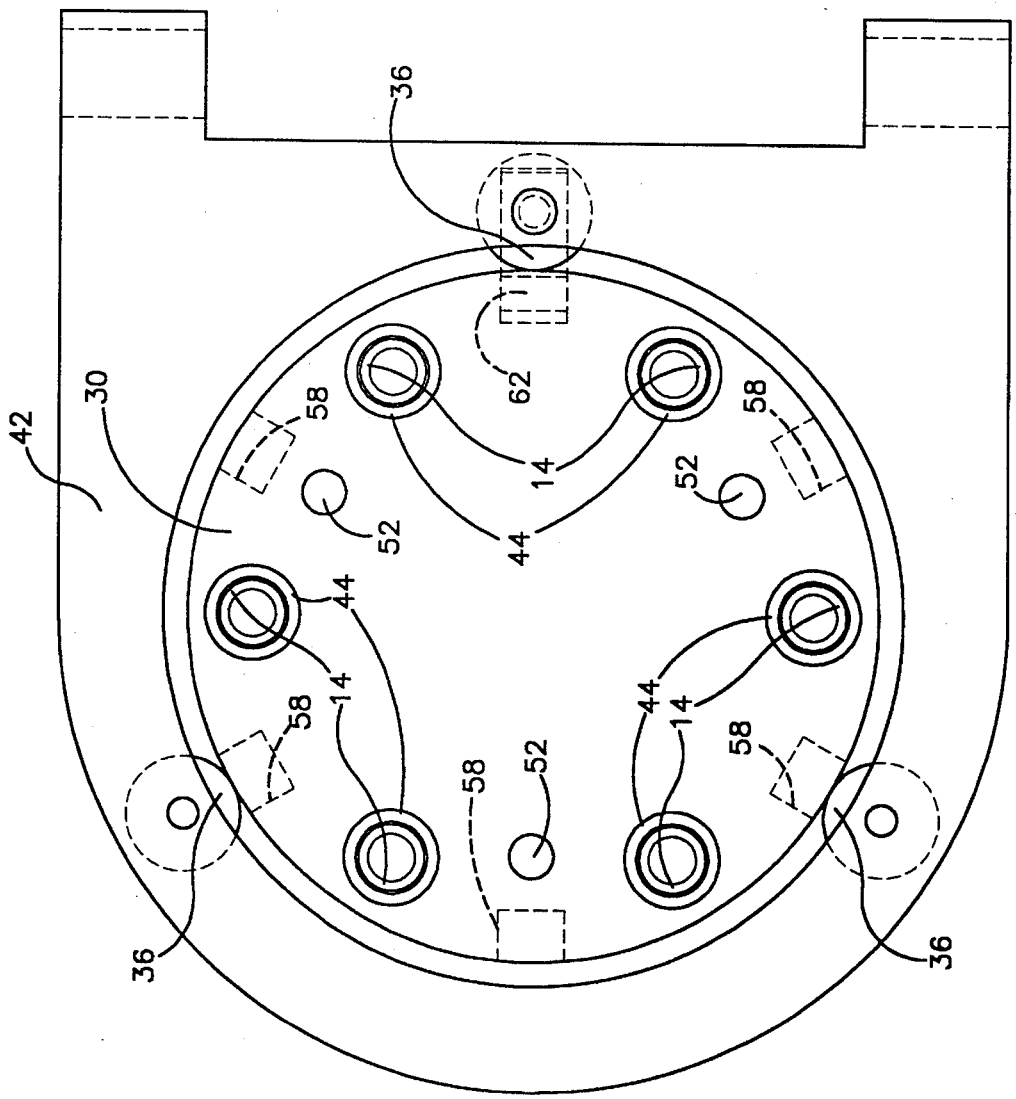
FIG. 2 is a partial elevational view as seen approximately from the plane indicated by the line 2—2 in FIG. 1.

A lock device 56 (FIG. 1) is provided on the pivoting frame 42 to prevent rotation of the pivoting part 38 when the magazine 24 is open and the pins 52 are disengaged. As seen in FIGS. 1 and 3, the locking device 56 includes a finger 62 which slides back and forth in the axial direction of the magazine 24. The pivoting part 38 is locked against rotation when the finger 62 engages one of a plurality of notches 63 formed in the pivoting support member 30. Each notch 63 corresponds to one of six indexed positions where the magazine 24 may stop as determined by the positions of the work stations of the lathe 10. A pusher arm 64 is connected to the finger 62. A spring 66 is coaxially mounted on the pusher arm and rests between the finger 62 and the pivoting frame 42. The spring 66 serves to urge the finger 62 and the arm 64 toward the interface between the pivoting and non-pivoting parts. When the magazine 24 is closed and the pins 52 are engaged, the end of the pusher arm 64 contacts the stationary frame 50 and pushes the finger 62 inward against the force of the spring 66 and out of the way of the support member 30. When the magazine 24 is opened, the arm moves outward under the force of the spring 66 and causes the finger to engage with one of the notches 63. Thus, misalignment of the tubes 14 during reloading is prevented.

Figure 5:
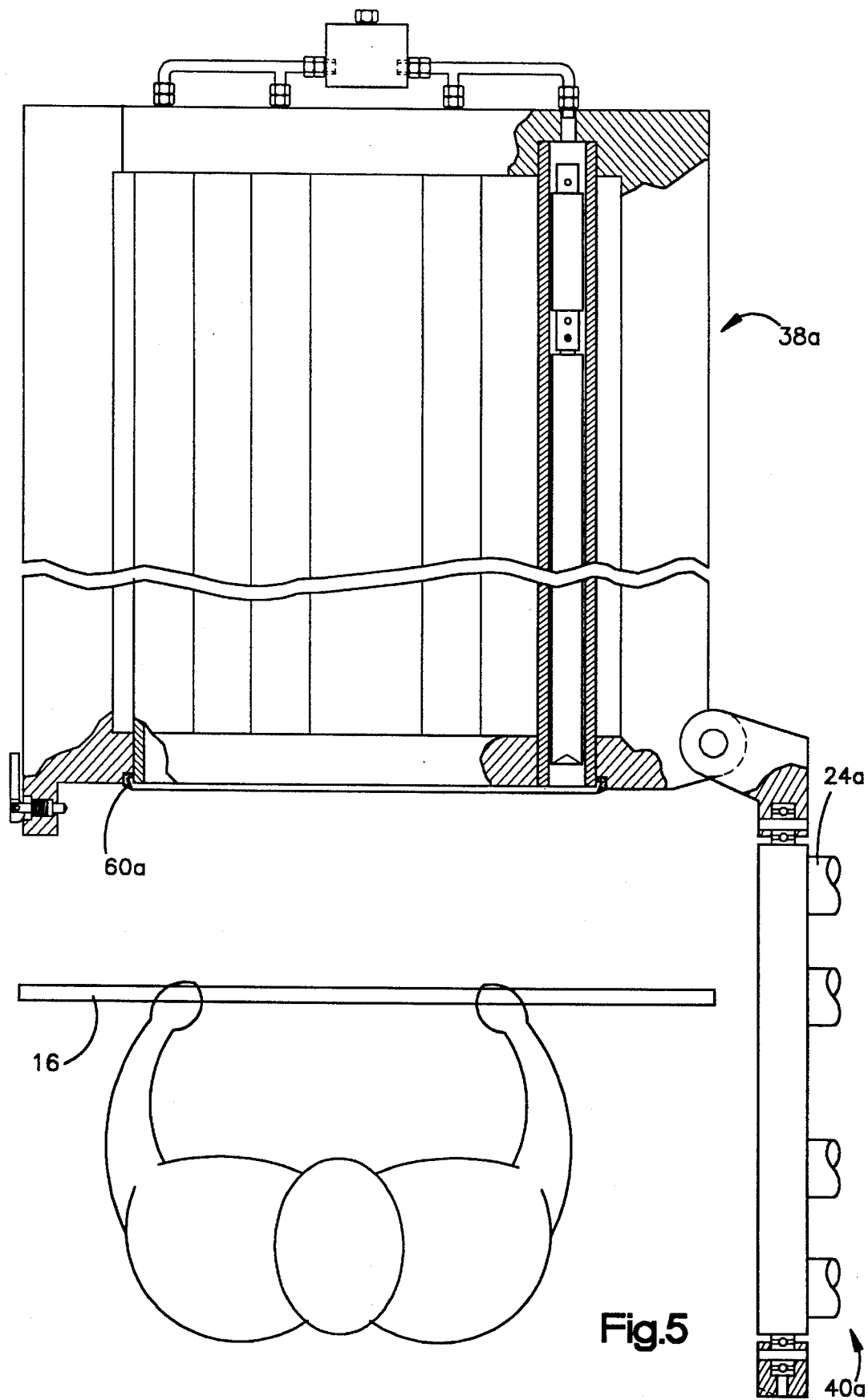
FIG. 5 is a plan view of an alternate embodiment of the bar stock feeder with parts omitted and parts cut away.

In an alternate embodiment shown in FIG. 5, the parts of which are designated with an additional lower case "a", the pivoting part 38a of the magazine 24a is stationary and does not rotate with the non-pivoting part 40a. A large circular elastomeric seal 60a is provided at the interface between the non-rotating pivoting part 38a and the rotating non-pivoting part 40a to prevent the loss of hydraulic fluid.

Figure 7:
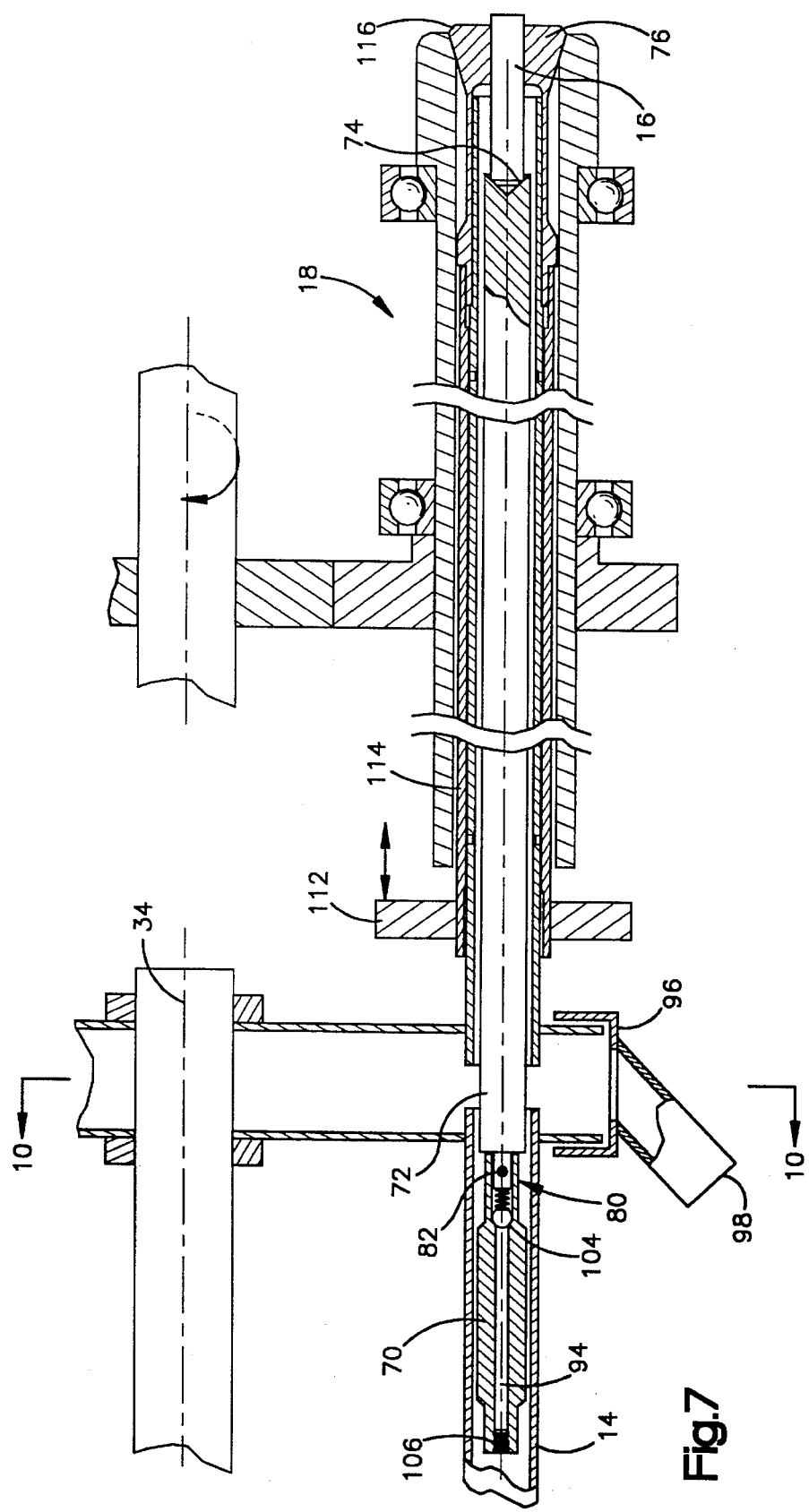
FIG. 7 is a sectional view with parts omitted of a single spindle of the multiple spindle lathe.
Figure 9:
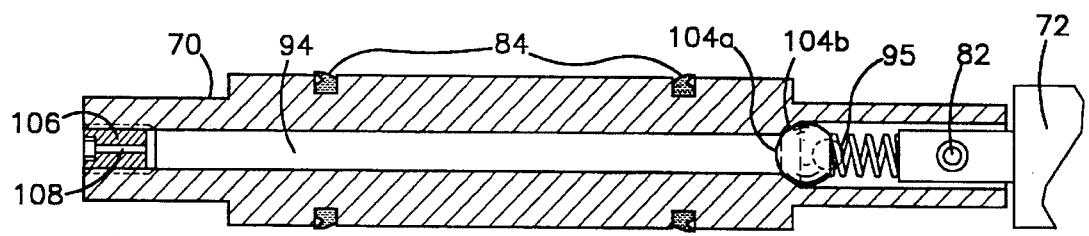
FIG. 9 is a sectional view of an alternate piston construction.
Figure 10:
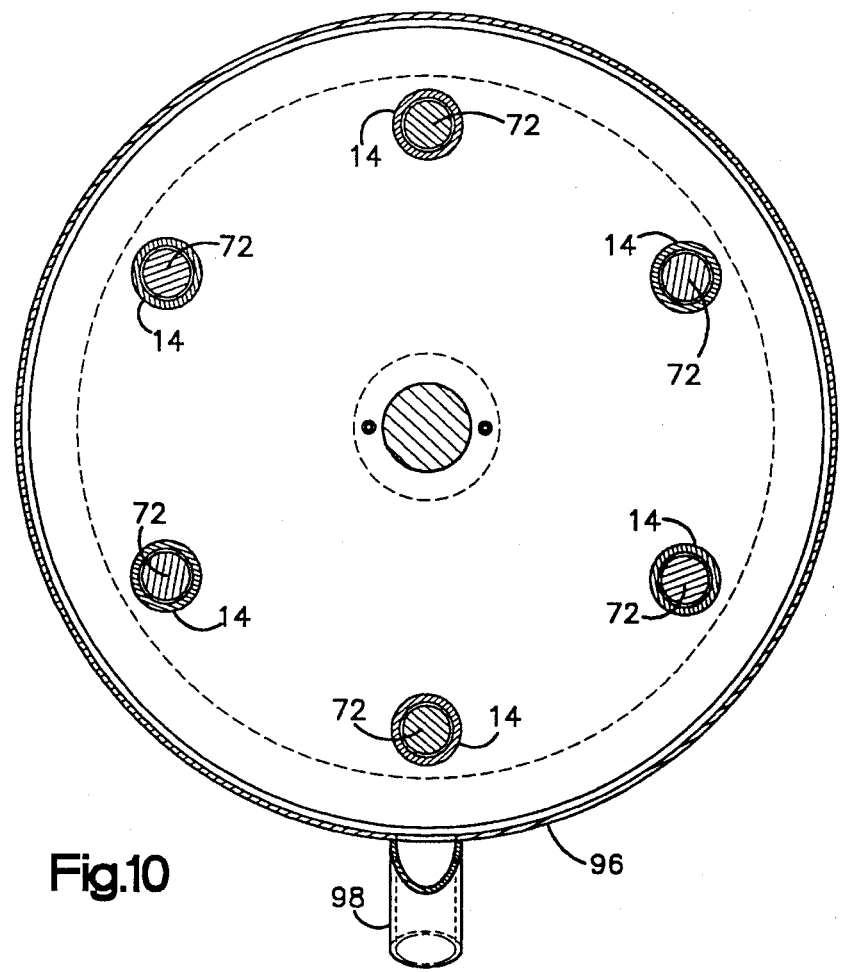
FIG. 10 is a sectional view as seen approximately from the plane indicated by the line 10—10 in FIG. 7.

Each tube 14 contains a piston 70 as seen in FIGS. 1, 6, and 7. When hydraulic fluid is delivered to the rear of the tubes 14, each piston 70 advances a corresponding piece of stock 16 toward the spindle 18. Each piston 70 is connected to a pusher 72. Each pusher 72 has a conical hole 74 in its front end for centering and supporting the rear of the stock 16. The length of each pusher 72 is approximately the length of the spindles 18 such that each pusher 72 may reach a corresponding collet 76 while its associated piston 70 remains inside its tube 14. A flexible joint 80 joins each pusher 72 to its associated piston 70. The joint 80 is formed by a pin 82, which passes through both the piston 70 and the pusher 72. The pusher 72 is able to pivot about the axis of the pin 82. The flexible joint 80 limits the motion transmitted from the pusher 72 to the piston 70 due to vibration of the pusher 72. The clearance between the piston 70 and the tube 14 wall is preferably 0.006 to 0.010 inches. As shown in FIG. 9, the piston 70 may be provided with elastomer seals 84 to provide a seal with the tube 14.

Figure 11:
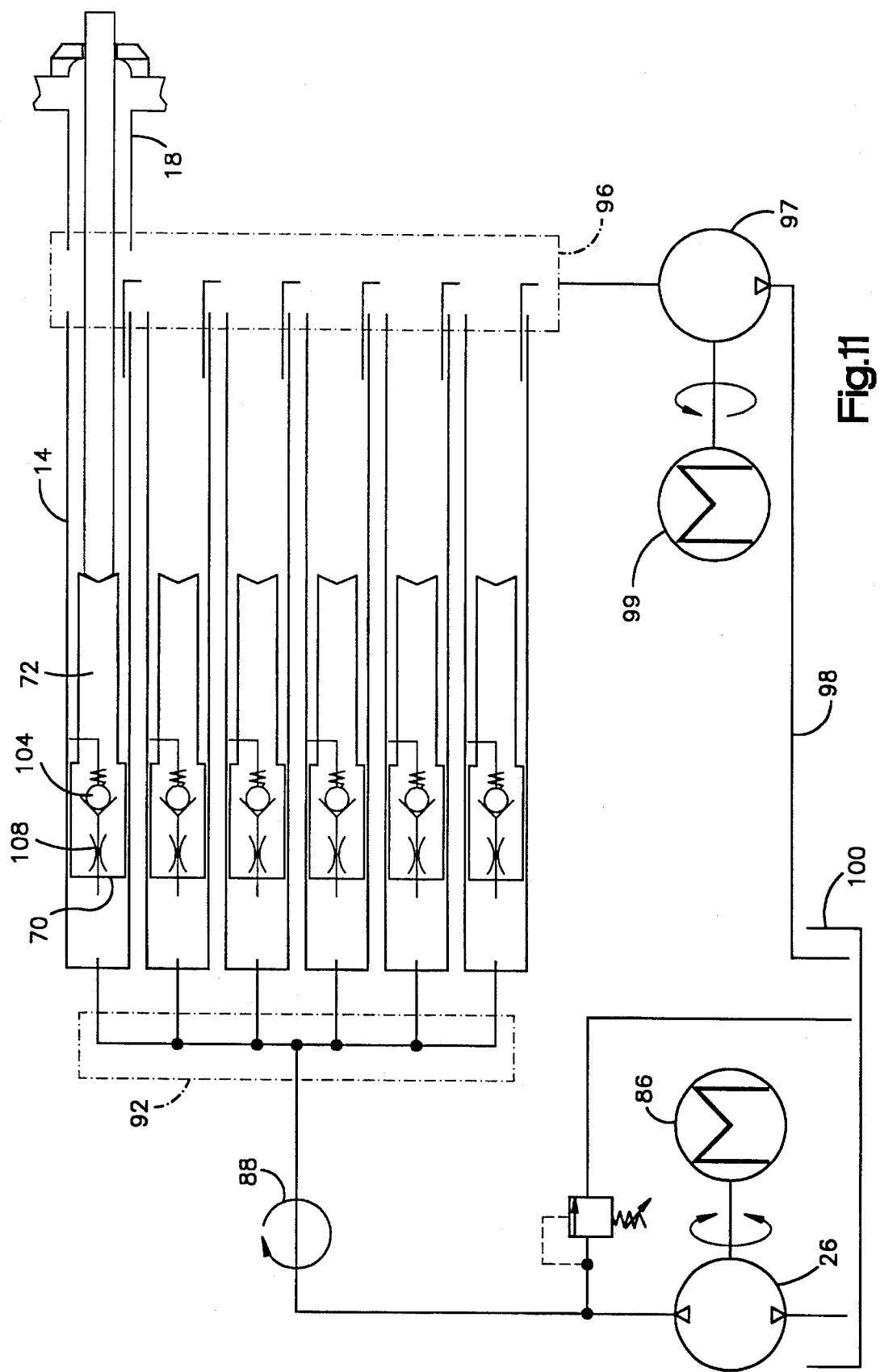
FIG. 11 is a schematic diagram of the hydraulic fluid circuit of the bar stock feeder.

Hydraulic fluid is delivered to the rear of each tube 14 from the pump 26. As seen in FIG. 11, the pump 26 is driven by a motor 86. A hydraulic line carries fluid from the pump to a rotatable coupling 88. The fluid is delivered to a distributor 92 where it is distributed to each tube 14. Passages 94 are provided in each piston 70 so hydraulic fluid may pass through each piston 70 and flow to the remainder of each tube 14. Openings 95 are provided in the side of each piston 70 to facilitate the flow of fluid from the passage 94 to the tubes 14. Fluid flows from the front of each tube 14 and into the fluid recovery device 20, which includes a recovery vessel 96, a pump 97 and a return pipe 98. Fluid is pumped from the return pipe 98 to a reservoir tank 100 by the pump 97. A motor 99 drives the pump as seen in FIG. 11. Optionally, the pump 97 may be omitted since flow by gravity will also return the fluid at a slower rate.

Figure 8:
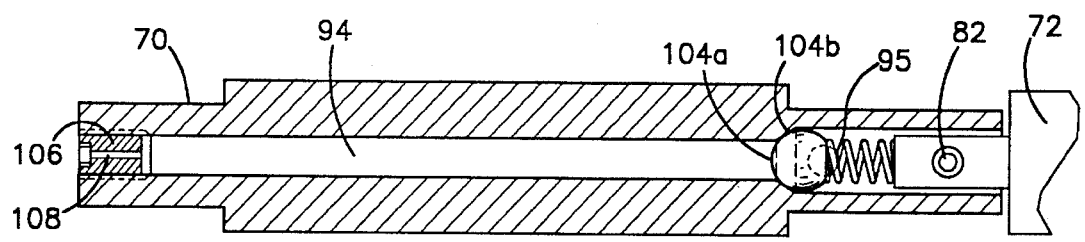
FIG. 8 is a sectional view of the piston shown in FIG. 7.

The pump 26 is reversible for creating suction in the rear of the tubes 14 for retracting the pistons 70. Check valves 104 (FIG. 11) are provided in each passage 94, which close upon the reversal or stoppage of the pump 26. In the preferred and illustrated embodiment, each check valve 104 is a spring loaded ball 104A which is biased against an opening 104B (FIGS. 8 and 9). The check valves 104 permit fluid to flow toward the spindles 18 only.

Each piston 70 has a removable insert 106 threaded into its end as seen in FIGS. 8 and 9. Each insert 106 has an orifice 108 the size of which is a factor determining the flow rate of hydraulic fluid through the tubes 14 and the pressure on the pistons 70. Thus, the insert 106 may be replaced with a different insert 106 having a different sized orifice 108 to vary and fine tune the operating characteristics of the machine.

It is desirable to have clearance between the bar stock 16 and the tube wall of approximately 0.0300 inch to 0.3125 inch to achieve the benefits of hydraulic stock support. Preferably, the clearance is approximately 0.0600 inch. Where smaller diameter stock 16 is to be used, tube liners (not shown) may be inserted to reduce the inside diameter of the tubes 14. When tube liners are employed, smaller diameter pistons 70 and pushers 72 are also required.

Referring to FIG. 7, a follower 112 is moved by a control mechanism (not shown) on the lathe 10 to open and close the collet 76. As viewed in FIG. 7, movement of the follower 112 to the right moves a collet sleeve 114 to the right, which opens a set of jaws 116. When the jaws 116 are open, the force of the pusher 72 on the bar stock 16 causes the stock 16 to advance to the right until it contacts a stop (not shown). The follower then moves left pulling the collet sleeve 114 left drawing the jaws 116 onto the spindle 18 gripping the stock. The forward end of the stock 16 is cut off when a workpiece is completed and the stock is again advanced according to the operation of the lathe 10.

When the stock 16 is depleted, the machine operator reverses the flow of the pump 26, which causes the pistons 70 to retract or move to the left as viewed in FIG. 6. The pistons 70 wipe the hydraulic fluid from the inside surfaces of the tubes 14 as they retract. The pivoting part 38 has a predetermined length which is sufficient to accommodate the full length of the piston 70 and the pusher 72. Once the piston 70 is fully retracted and entirely within the pivoting part 38, the pump 26 is shut off, the latch member 46 is released and the pivoting part 38 is pivoted clockwise as viewed in FIG. 1 to open the tubes 14. Due to the wiping action of the pistons 70, little if any oil exits from the tubes 14 when they are opened. A new piece of stock 16 is then placed inside each tube 14 of the non-pivoting part 40 as seen in FIG. 1. Then, the pivoting part 38 is pivoted counterclockwise as viewed in FIG. 1 and the latch member 46 is secured. The pump 26 is then operated in its forward direction to deliver fluid to the tubes 14 and cause the new stock 16 to be advanced. Thus, the pivoting part 38 permits loading of stock 16 from the rear of the machine 12 which allows for an efficient plant layout. Also, the pivoting part 38 holds the pistons 70 and pushers 72 out of the way so they are not an obstacle to reloading.

Figure 12:
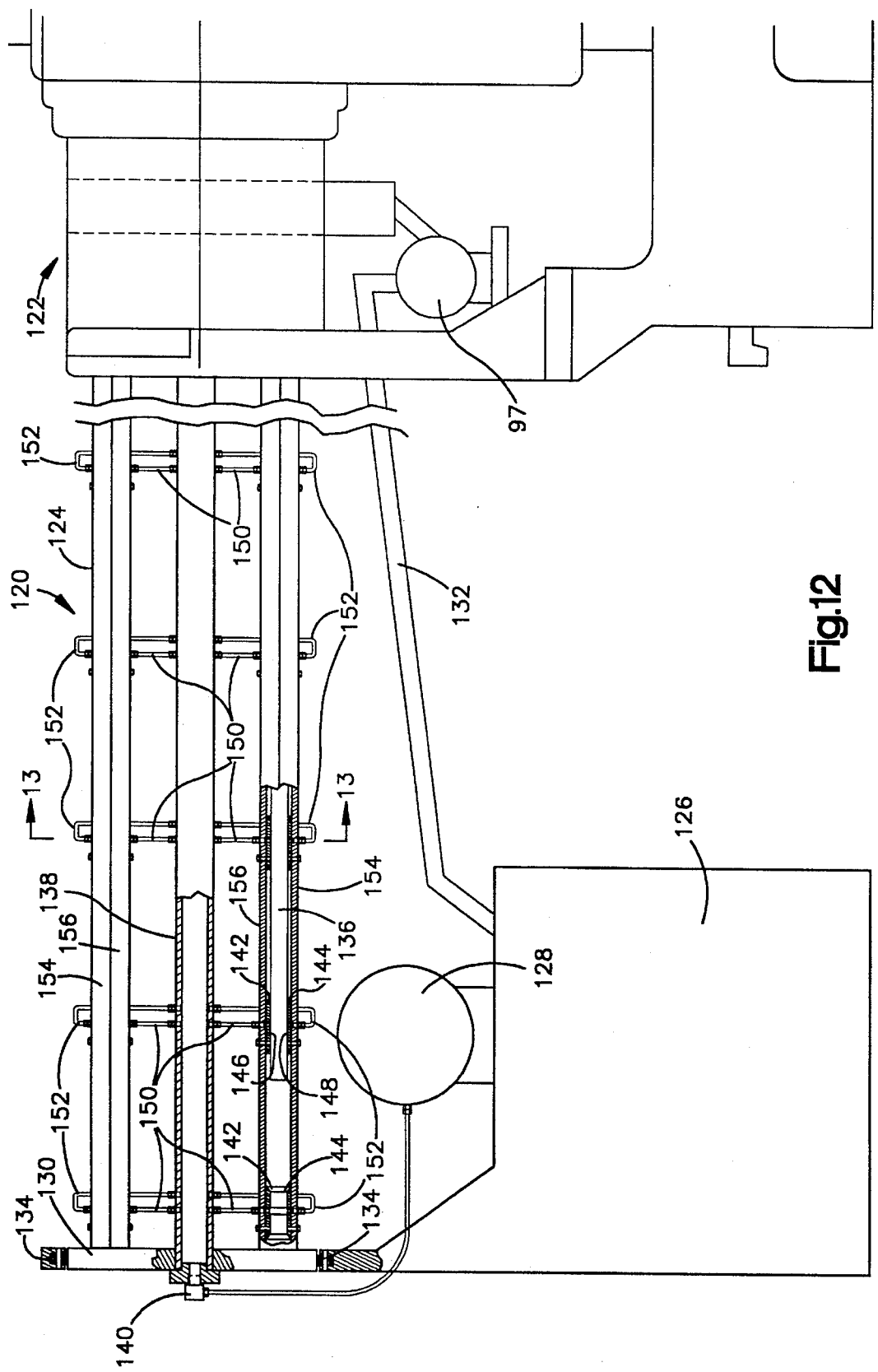
FIG. 12 is a front elevational view with parts cut away of an alternate embodiment of the bar stock feeder.
Figure 13:
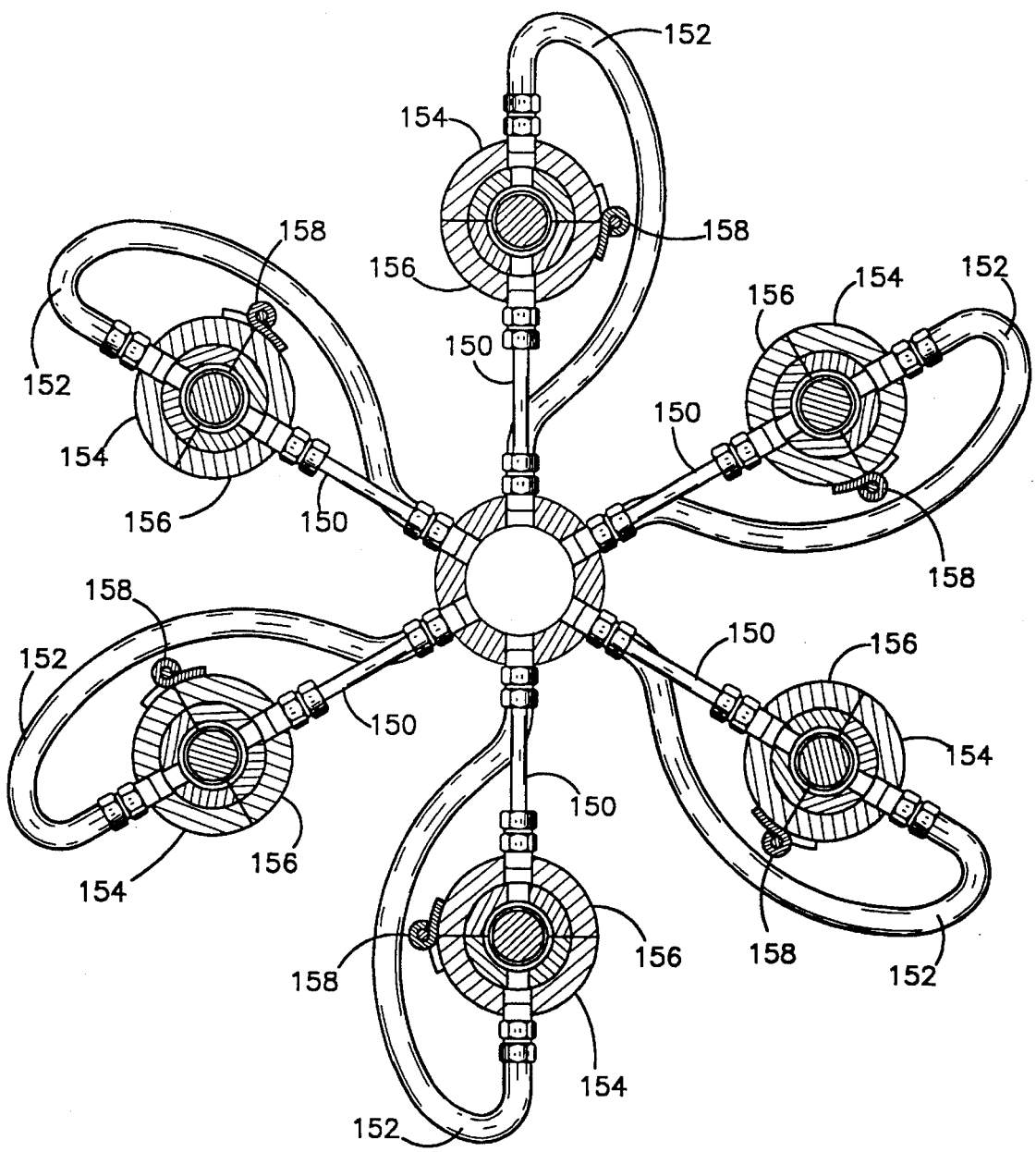
FIG. 13 is a sectional view as seen approximately from the plane indicated by the line 13—13 in FIG. 12.

In an alternate embodiment shown in FIGS. 12 and 13, a bar stock feeder 120 is shown connected to a lathe 122. The feeder 120 includes a set of guide tubes 124, a base 126, a pump 128, an end support plate 130, and a fluid recovery system 132. The tubes 124 are mounted on the end support plate 130, which is mounted on rollers 134 allowing the tubes 124 to orbit a center axis like the magazine 24 described previously. The forward ends of the tubes 124 are supported by a front bearing (not shown) and are connected to a drive mechanism operated by the lathe 122 for synchronous movement with the lathe spindles in a conventional manner. Pieces of bar stock 136 are advanced by a conventional feed mechanism which is part of the lathe 122.

The bar stock feeder 120 of FIG. 12 includes a hydraulic system for supporting the bar stock 136 on a film of oil. The pump 128 is connected to a reservoir tank (not shown) and is mounted to the base 126. Hydraulic fluid is delivered by the pump 128 to a center pipe 138 through a rotating coupling 140. From the center pipe 138, fluid is delivered to a plurality of inner bearing blocks 142 and opposed outer bearing blocks 144. The sets of bearing blocks 142,144 are located at spaced intervals along the length of the tubes 124. Each bearing inner block 142 has an inner port 146 and each outer block 144 has an outer port 148 through which pressurized fluid flows to support the bar stock 136. The center pipe 138 is connected to each inner port 146 with inner pipes 150. Each outer port 148 is connected to the center pipe 138 with a flexible hose 152. The clearance between the stock 136 and the bearing blocks 142,144 is preferably approximately 0.060 inches during operation.

Each tube 124 is split longitudinally into two parts; a pivoting part 154 and a non-pivoting part 156. Each pivoting part 154 is connected to its associated non-pivoting part 156 with at least one hinge 158 (FIG. 13). A suitable retainer mechanism (not shown) is employed to hold the tubes 124 in their closed position during operation. When the stock 136 is depleted, the pump 128 is turned off and each tube 124 is opened by pivoting the pivoting part 154 away from the non-pivoting part 156. A new piece of stock 136 is placed inside on the bearing blocks 142. Then, the tube 124 is closed and the pump 128 is started.

The hydraulic fluid flows from the forward ends of the tubes 124 and is recovered by the fluid recovery system 130, which is much like the fluid recovery system 20 described previously. In addition, a catch basin (not shown) may be employed beneath the bar stock feeder 120 to catch fluid which leaks from between the pivoting and non-pivoting parts 154,156.

While preferred embodiments of this invention have been described in detail, it will be apparent that certain modifications or alterations can be made without departing from the spirit and scope of the invention set forth in the appended claims.

We claim:

1. Apparatus for aligning and feeding bar stock to a head stock of a multiple spindle lathe, said apparatus comprising:

a plurality of parallel guide tubes for supporting pieces of bar stock for movement toward the head stock, each of the parallel guide tubes comprising a first elongated tube section and a second elongated tube section separable from the first elongated tube section along a plane transverse to a longitudinal axis of the guide tube to allow insertion of the bar stock into one of the guide tubes and a seal for sealing each tube at an interface between the first and second elongated tube sections;

a plurality of piston assemblies, each fitted to slide inside a respective one of said guide tubes for engaging one end of a corresponding piece of said bar stock and pushing said piece toward said head stock;

fluid supply means for delivering fluid under pressure to the inside of said guide tubes for moving said piston assemblies;

a first support member and a second support member separable from the first support member, the first section of each of the guide tubes supported in the first support member and the second section of each of the guide tubes supported in the second support member, one of said first and second support members being moved with respect to the other support member to separate the first and second sections of all of said guide tubes as a group to permit reloading of bar stock into any one of the first sections of said tubes with said piston assemblies being in a retracted position within the second sections of their respective guide tubes.

2. An apparatus according to claim 1 wherein said first and second support members are supported in respective frames for indexed rotation such that said guide tubes orbit about a center axis.

3. An apparatus according to claim 2, wherein one are more locating pins extending from one of said first and second support members interfits with corresponding apertures in the other of said first and second support members whereby the first and second support members rotate in unison.

4. An apparatus according to claim 1 wherein said first support member is supported for indexed rotation, the second support member is stationary with respect to the indexed rotation of the first member and an elastomeric seal is disposed between adjacent surfaces of the first and second support members.

5. An apparatus in accordance with claim 1, wherein the fluid supply means comprises a distributor for delivering fluid to each of the guide tubes.

6. An apparatus in accordance with claim 1, wherein said fluid supply means comprises a reversible pump for moving said piston assemblies inside their respective guide tubes toward and away from said head stock.

7. An apparatus in accordance with claim 1, wherein each piston assembly includes a piston having a passage for permitting fluid to pass through said piston.

8. An apparatus according to claim 1, wherein a fluid return vessel is provided at ends of the guide tubes nearest the head stock for catching fluid which flows from the end of each guide tube and returning it to a reservoir from which said fluid supply means draws fluid.

9. Apparatus for aligning and feeding bar stock to a head stock of a multiple spindle lathe comprising:

a plurality of parallel guide tubes for supporting pieces of bar stock, said guide tubes extending through a magazine having a center axis and comprised of a front guide tube support part and an adjacent rear guide tube support part, the front and rear guide tube support parts being separable, each guide tube comprising a first portion and an adjacent second portion, the first and second portions being separable, the first portion of each guide tube being supported by the front support part of the magazine and the second portion of each guide tube being supported by the rear support part of the magazine;

a plurality of piston assemblies, each slidably fitted inside a different one of said guide tubes for engaging one end of a corresponding piece of said bar stock and pushing said piece toward said head stock;

a fluid pressure means for applying fluid under pressure to the inside of said guide tubes for moving said piston assemblies, said fluid serving to hydraulically support said stock within each tube as said stock is rotated at high speeds; and a hinge that pivotally connects the front and rear support parts of said magazine to permit the front and rear support parts to pivot with respect to each other to reload the first portions of said tubes with bar stock, said second portions of the guide tubes containing said piston assemblies during said reloading.

10. An apparatus according to claim 9 wherein the fluid pressure means includes a pump and a rotatable coupling for coupling a fluid delivery line from said pump to said guide tubes.

11. An apparatus according to claim 9 including a fluid recovery vessel located at one end of said tubes nearest the head stock for catching fluid from the ends of said tubes.

12. The apparatus set forth in claim 9 wherein each piston assembly includes a piston with one or more passages to permit fluid to pass through the piston and flow into the first portion of its respective guide tube to hydraulically support the bar stock within the tube.

13. The apparatus set forth in claim 12 wherein each piston assembly includes a pusher disposed between the piston and the bar stock in its respective guide tube and the fluid pressure advances the piston which in turn advances the pusher and the bar stock toward the head stock.

14. The apparatus set forth in claim 9 wherein for each guide tube an elastomeric seal is provided at an interface of the first and second portions of the guide tube to seal each guide tube.

15. The apparatus set forth in claim 9 wherein the front and rear parts of the magazine are generally cylindrical and are supported for indexed rotation about a common longitudinal axis in respective frames.

16. The apparatus set forth in claim 9 wherein the front part of the magazine is generally cylindrical and supported for indexed rotation about a longitudinal axis, an elastomeric seal disposed between adjacent surfaces of the front and rear parts of the magazine.

17. A method of using a bar stock guide apparatus for aligning and feeding a plurality of pieces of bar stock to a head stock of a multiple spindle lathe, said method comprising the steps of:

supporting a first plurality of parallel guide tube sections for supporting said bar stock on a first support and supporting a second plurality of parallel guide tube sections for supporting said bar stock on a second support, said tube sections being separable along a sealed interface into a rear part and a front part, the front part being closer to the head stock;

pivotally connecting the first and second supports to allow the front and rear parts of the guide tubes to pivot with respect to each other;

providing a piston inside each of said guide tubes for engaging said bar stock and pushing said bar stock toward said head stock;

moving each of said pistons to a predetermined position within the rear part of its respective guide tube by controlling the fluid pressure within the tubes;

separating said front part from said rear part of the guide tubes along their respective sealed interfaces by pivoting the first and second supports with respect to each other;

depositing a piece of bar stock inside said front part of one of the separated tubes to reload the tube;

again pivoting the first and second supports to rejoin said front and rear parts of the guide tubes along their respective interfaces; and pushing a newly loaded bar stock toward said head stock with a piston in the guide tube that supports the newly loaded bar stock by controlling the fluid pressure within the tubes.

18. A method according to claim 17 comprising the additional step of recovering fluid which flows from an end of each of said tubes nearest the head stock.

19. Apparatus for aligning and feeding bar stock to a head stock of a multiple spindle lathe, said apparatus comprising:

a plurality of parallel guide tubes for supporting pieces of bar stock for movement toward the head stock, each of the parallel guide tubes comprising a first elongated tube section and a second elongated tube section separable from the first elongated tube section along a plane transverse to a longitudinal axis of the guide tube to allow insertion of the bar stock into one of the guide tubes;

a plurality of piston assemblies, each fitted to slide inside a respective one of said guide tubes for engaging one end of a corresponding piece of said bar stock and pushing said piece toward said head stock;

fluid supply means for delivering fluid under pressure to the inside of said guide tubes for moving said piston assemblies;

a first support member and a second support member pivotally connected to the first support member, the first section of each of the guide tubes supported in the first support member and the second section of each of the guide tubes supported in the second support member, one of said first and second support members being pivoted with respect to the other support member to separate the first and second sections of each of said guide tubes along said plane to permit reloading of bar stock into one of the first and second sections of said tubes with said piston assemblies in a retracted position within the other of the first and second sections of their respective tubes.

* * * * *